United States Patent [19]
Bissinger

[11] Patent Number: 5,470,165
[45] Date of Patent: Nov. 28, 1995

[54] RETAINING BUSHING FOR JOINING BEARING RINGS

[75] Inventor: Ronald Bissinger, Schweinfurt, Germany

[73] Assignee: SKF GmbH, Schweinfurt, Germany

[21] Appl. No.: 104,877

[22] Filed: Aug. 10, 1993

[30] Foreign Application Priority Data

Aug. 12, 1992 [DE] Germany ............... 42 26 618.1

[51] Int. Cl.$^6$ .................................................. F16B 2/02
[52] U.S. Cl. .................. 403/313; 384/499; 384/539; 403/26; 403/314
[58] Field of Search ............... 403/26, 298, 313, 403/314, 320, 396, 397, 406.1, 409.1; 384/499, 504, 505, 506, 539

[56] References Cited

U.S. PATENT DOCUMENTS

| | | | |
|---|---|---|---|
| 1,206,482 | 11/1916 | Starin | 384/504 |
| 1,280,620 | 10/1918 | Laycock | 384/504 |
| 1,379,945 | 5/1921 | Teetsow | 384/506 X |
| 1,633,798 | 3/1926 | Taylor | 403/298 X |
| 2,651,554 | 11/1951 | Recknagel | 384/504 |
| 5,127,762 | 7/1992 | Havlovitz | 403/298 |
| 5,174,676 | 12/1992 | Welsch et al. | 403/298 X |

FOREIGN PATENT DOCUMENTS 3109601 9/1982 Germany ............... 403/313

*Primary Examiner*—Dave W. Arola
*Assistant Examiner*—Andrea Chop
*Attorney, Agent, or Firm*—Eugene E. Renz, Jr.

[57] ABSTRACT

Retaining bushing for securing bearing rings comprising a strip of sheet metal bent to form a cylinder having radially projecting retaining projections engaging in a positively locking fashion in grooves in the bearing rings, the retaining projections being distributed around the periphery and being raised up from the sheet material in the radial direction by deep-drawing and stamped out to the required width along a circumferential line around the retaining bushing.

6 Claims, 2 Drawing Sheets

RETAINING BUSHING FOR JOINING BEARING RINGS

FIELD OF THE INVENTION

The present invention relates to retaining bushings for bearing rings.

BACKGROUND OF THE INVENTION

Retaining means for holding bearing rings together is not new per se. For example, U.S. Pat. No. 1,908,474 is an example of an axially slotted retaining ring having solid peripheral ribs which can be utilized to connect bearing rings. As shown in this patent, the bearing rings have corresponding grooves and retaining surfaces so that the retaining can be slid radially under the level of the seating surfaces of the bearing rings. The retaining ring is held in place not only by the clamping effect produced by its intrinsic tension, but also by the installation of the bearing. This retaining ring is manufactured from a profiled strip and is rather costly to manufacture.

Another example of retaining means in accordance with the prior art is shown in West German Offenlegungsschrift No. 3,537,985. This publication shows unslotted retaining rings made of plastic with elastic retaining tongues. These plastic retaining rings have a limited application and have the disadvantage of only producing relatively weak retaining forces.

It is noted that high tensile forces occur between the split rings of a bearing during installation, particularly in the case of large bearings. These forces occur when the bearing is pushed onto a shaft or inserted into a housing seal. It has been found that the strength of the known retaining rings discussed above is not satisfactory in these applications.

The present invention has particular application in large bearings wherein tensile forces occur between the split rings of a bearing during installation, e.g. when the bearings are pushed onto a shaft or inserted into a housing seat. It has been found that the strength of the known retaining rings described herein are insufficient in these applications.

SUMMARY OF THE INVENTION

With the foregoing in mind, it is an object of the present invention to provide a retaining ring generally of the type described above which is characterized by novel features of construction and arrangement providing high retaining forces which can also be produced at relatively low cost economically.

To this end, the retaining ring of the present invention has a series of projections distributed about its periphery which are raised from the sheet material in the radial direction by deep drawing and then are stamped out to the desired width along a line passing around the circumference of the retaining bushing.

By this construction, the retention function is located in the area of the stamping line; that is, the end where the retaining projection has been stamped out forms the retaining surface for the bearing ring. Further, by this configuration the outer boundaries of the retaining projections are solid and are integrally connected to the material of the bushing without separation. The material of the bearing bushing located between the boundary lines is merely stretched and deep-drawn up from the level of the bushing, so that an arched, knuckle-like shape is produced. The resultant shape produced by the forming means yields a retaining bushing characterized by extremely high strength, dimensional stability, and immunity to damage even when very thin sheet material is used to form the retaining bushing.

Functionally high forces can be absorbed because support is provided on all sides, particularly in the retaining direction. Furthermore, in a bearing bushing in accordance with the present invention, there are no sharp edges or corners which may cause damage to the bearing particularly to the seating surfaces when assembled.

In accordance with an additional feature of the present invention, the projections arch outwardly around the periphery from the material of the bushing section. The arched shaped adds additional strength particularly when the bearing bushing is used in bearing bores, where it is possible to push the bushing inwardly in correspondence with the direction of curvature.

In accordance with a more specific feature of the present invention, the retaining projections are designed in such a way that they slope down continuously in the axial direction, decreasing from the highest radial point above the lateral surface in the area of the stamping line until they reach the level of the lateral surface. By this arrangement, optimum support is provided for the retaining forces acting on the end surface of the stamped area. Accordingly, on insertion into a bearing bore, the backs of the retaining projections serve advantageously as a guide ramp.

In accordance with another feature of the present invention, the end face of the retaining surface of the projections is situated in a plane extending at a slight angle to the radial plane of the retaining bushing. This angle is preferably in the range of about 5° to 15° and is produced by the special deep drawing process and by the shape of the retaining projections. This design feature facilitates snapping the retaining projections in behind the retaining surface of the groove and the bearing rings and produces a positive locking engagement between the parts. This angle is broadly in the range of angles which is still self retaining on application of the retaining forces.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
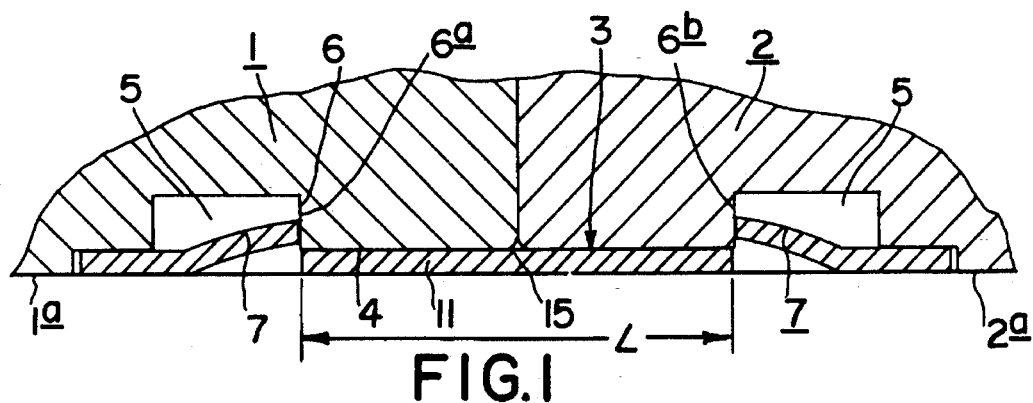
FIG. 1 is an enlarged fragmentary longitudinal sectional view through two bearing rings connected by the retaining bushing in accordance with the present invention.

Referring now to the drawings and particularly to FIG. 1 thereof, there is shown two rings, in the present instance, bearing rings 1 and 2 joined together or connected at there axially end faces and held axially and radially forming a common bore $1^a$, $2^a$ by a retaining bushing 3 made in accordance with the present invention. The bore $1^a$ and $2^a$ of the wall rings 1 and 2 are enlarged, as shown at 4 in the drawing, ring shaped grooves 5 are machined in the bores. The Peripheral side surfaces 6 of the grooves 5 function as retaining surfaces.

Figure 5:
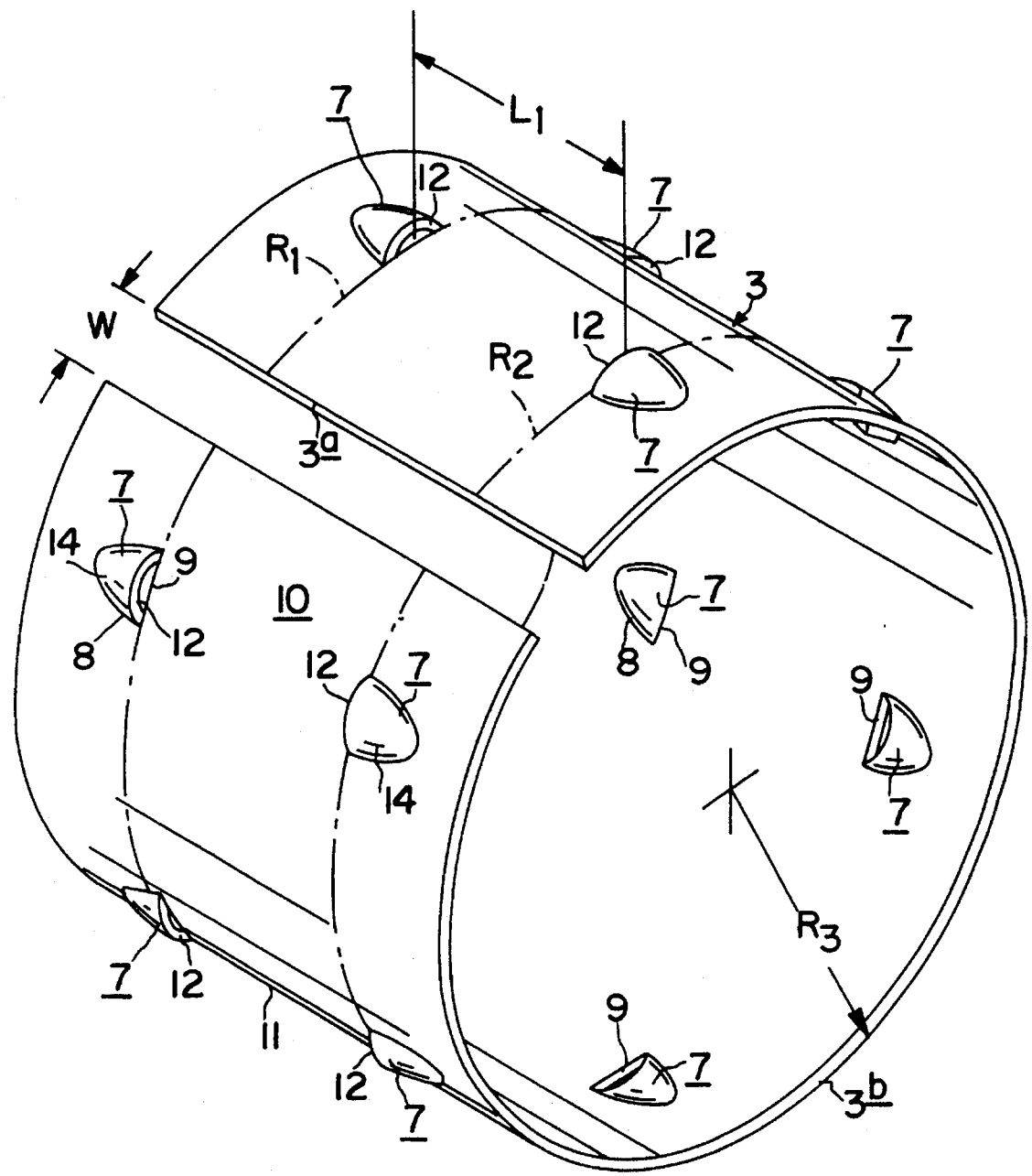
FIG. 5 is an enlarged isometric view of the retaining bushing described in this invention.

In accordance with the present invention, the retaining bushing 3 is characterized by novel features of construction and arrangement providing an effective locking means for securing bearing rings and which can be made economically at relatively low cost. To this end, as shown in FIG. 5 the retaining bushing 3 is made of a strip of sheet metal 11 which is cylindrically formed and provided with an axial slot $3^a$. The retaining bushing 3 is formed with two axially spaced rows R and $R_2$ of retaining projections 7. The projections in each row are circumferentially spaced.

Figure 2:
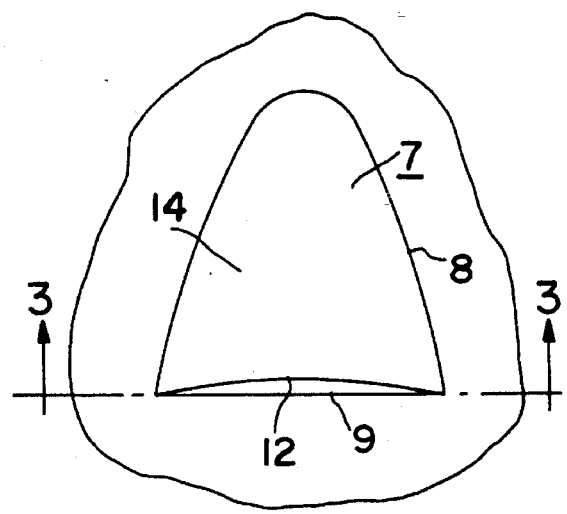
FIG. 2 is an enlarged fragmentary plan view showing a retaining projection formed on the outer surface of the retaining bushing of the type shown in FIG. 1.
Figure 3:
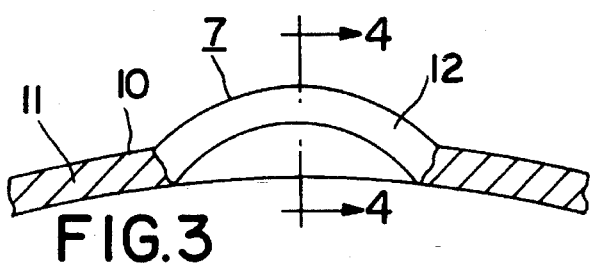
FIG. 3 is a fragmentary sectional elevational view taken on the line 3—3 of FIG. 2, showing the retaining projection according to FIG. 2 in cross section.
Figure 4:
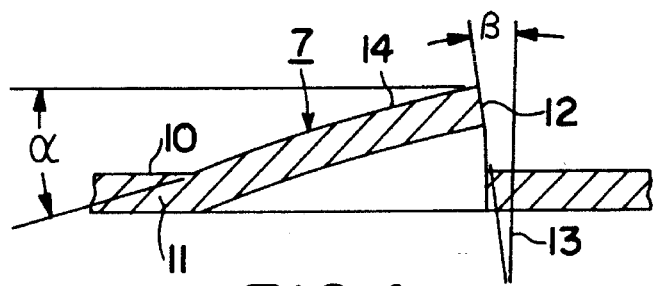
FIG. 4 is a side elevational view taken on the line 4—4 of FIG. 3, showing the retaining projection according to FIG. 2 in cross section.

The retaining projections 7 are raised at intervals about the periphery by deep-drawing and stamping. The projections so formed as best illustrated in FIG. 2 define boundary lines 8 and 9 which by the deep-drawing of the sheet metal produces a knuckle-shaped projection which is sharply curved in a circumferential direction and is of a radius much smaller than the radius $R_3$ of the body portion $3^b$ of the bushing. The knuckle-shaped projection is also gently curved in the axial direction as shown in FIG. 4. The knuckle-shapes slope down at an angle α of about 15° to the level of lateral surface 10 of bushing 3. The knuckle shapes are merely bent out of the plane of the cylindrical bushing along the curved boundary line 8. With the straight boundary line 9 extending in the circumferential direction, the retaining projection 7 is separated from the material of the cylindrical bushing 3 by stamping. As a result, a retaining or locking surface 12 is produced which in the assembled relation shown in FIG. 1 abuts the side surface 6 of the ring shape groove 5 and thus the two rings 1 and 2 are held together by positive locking engagement.

It is noted that the locking surfaces 12 of the two rows. $R_1$ and $R_2$ of projections face one another and are spaced a predetermined distance $L_1$ slightly greater than the distance L between the locking surfaces $6^a$ and $6^b$ of the retaining rings 1 and 2.

The locking surface 12 is slightly angled with respect to a radial plane 13 of retaining bushing 3. By this arrangement the process of snapping the bushing into the ring shaped groove is made easier. The surface 12 is preferably disposed at an angle β of about 10° relative to the radial plane 13.

The axial sloping surface 14 of the projection 7 serves as guide ramp. Accordingly, when the bearing is assembled, the retaining bushing 3 is first introduced into one of the bearing rings, for example, the bearing ring 1. In this process, the rounded edge 15 of bearing ring 1 produces a radial contraction of the retaining bushing 3 when the ramp surfaces 14 engage interiorly of the bore $1^a$. The bushing has an axial slot $3^a$ of predetermined width W to facilitate the radial action described above. This slot $3^a$ permits the bushing to contract and then expand into the position shown in FIG. 1. The second bearing ring 2 is inserted in the same manner until the projections 7 snap into the respective locking grooves of the rings when they are radially aligned therewith.

Even though a particular embodiment of the present invention has been illustrated and described herein, it is not intended to limit the invention and changes and modification may be made therein within the scope of the following claims.

What is claimed is:

1. A retaining bushing for securing bearing rings, comprising:

a cylindrical retaining ring including an axial slot along its entire length;

said ring having circumferentially spaced, radially outwardly projecting retaining projections about its periphery arranged in two axially spaced rows, said projections having a surface which slopes relative to a radial plane forming an outer portion and an inner portion with an opening whereby the axial distance between the surfaces is greater at the outer portion of the projection than at the inner portion which is adjacent the ring; and said retaining projections locking into radial grooves in the bearing rings to secure the bearing rings in abutting end to end relation.

2. A retaining bushing according to claim 1, wherein said retaining projections arch I up from the peripheral surface of the cylindrical retaining ring.

3. A retaining bushing according to claim 1, wherein said retaining projections, slope down continuously in the axial direction from the highest radial point above the peripheral surface of the cylindrical retaining ring at the outer portion of the surfaces of the projections down to the level of the peripheral surface.

4. A retaining bushing according to claim 1, wherein the outer portion of the surfaces of the retaining projections extends in a plane at a slight angle to the radial plane of the cylindrical retaining ring.

5. In an assembly for connecting two annular members in abutting end to end relationship, a retaining bushing comprising:

a cylindrical retaining ring split by an axial slot to permit radial contraction and expansion of said retaining ring, radially projecting retaining projections spaced circumferentially about the periphery of said retaining .ring arranged in two axially spaced rows, said projections having a surface which slopes relative to a radial plane forming an outer portion and an inner portion with an opening therebetween whereby the axial distance between the surfaces is greater at the outer portion of the projection than at the inner portion which is adjacent the ring; and said retaining projections locking into radial stepped grooves in the annular members to secure the annular members in the abutting end to end relationship whereby the inner circumferential surface of said retaining ring is flush with the inner circumferential surfaces of the annular members.

6. A retaining bushing for securing bearing rings, comprising a cylindrical retaining ring including an axial slot along its entire length;

said cylindrical retaining ring having circumferentially spaced, radially outwardly projecting retaining projections about its periphery arranged in two axially spaced rows, said projections having a surface which slopes relative to a radial plane forming an outer portion and an inner portion with an opening therebetween whereby the axial distance between the surfaces is greater at the outer portion of the projection than at the inner portion which is adjacent the ring; and said retaining projections locking into radial grooves in the bearing rings to secure the bearing rings, said retaining projections including a confronting edge on the outer portion sloped relative to the radius of said retaining ring whereby upon said locking of said retaining projections into the radial grooves, the bearing rings slide down said sloped confronting edges into the locking position.

* * * * *